(No Model.)

C. W. NOYES.
TWO WHEELED VEHICLE.

No. 356,495. Patented Jan. 25, 1887.

Witnesses.
John C Perkins

Inventor.
Charles W. Noyes
By Lucius C. West
atty.

UNITED STATES PATENT OFFICE.

CHARLES W. NOYES, OF KALAMAZOO, MICHIGAN.

TWO-WHEELED VEHICLE.

SPECIFICATION forming part of Letters Patent No. 356,495, dated January 25, 1887.

Application filed December 11, 1886. Serial No. 221,277. (No model.)

*To all whom it may concern:*

Be it known that I, CHARLES W. NOYES, a citizen of the United States, residing at Kalamazoo, county of Kalamazoo, State of Michigan, have invented a new and useful Two-Wheeled Vehicle, of which the following is a specification.

This invention relates to the well-known class of two-wheeled vehicles in which the body or seat-bars are fulcrumed at the forward end to the thills and are suspended or supported over the axle.

The object of the invention is to combine with such a body a torsion-spring attached to it and the axle to support the rear end of said body.

Figure 1:
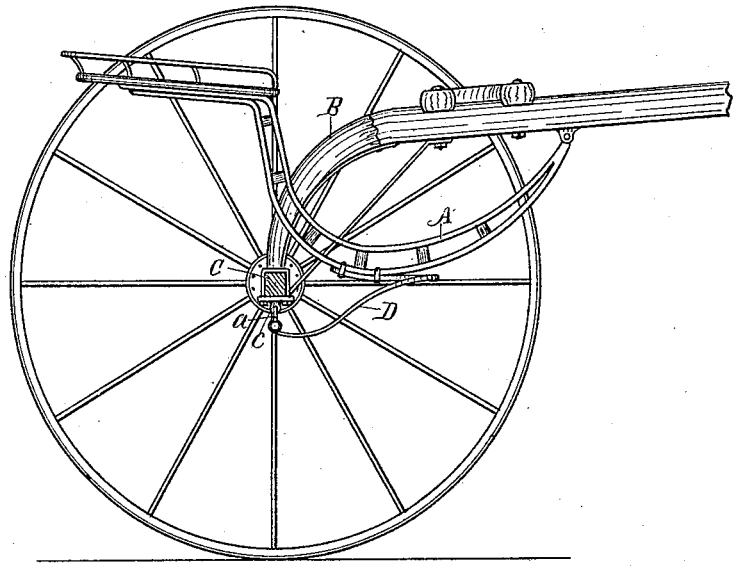
Figure 2:
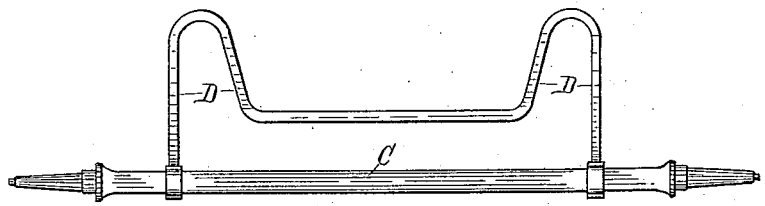
Figure 3:
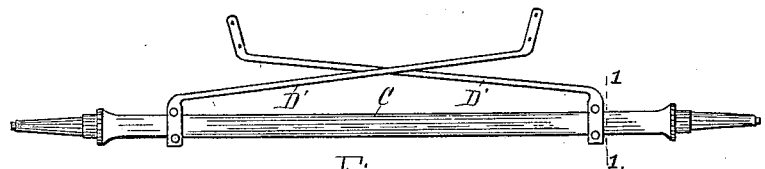
Figure 4:
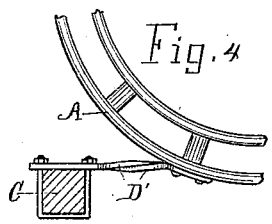

In the drawings forming a part of this specification, Figure 1 is a side elevation with one wheel removed; Fig. 2, plan of the axle and spring in Fig. 1; Fig. 3, same as Fig. 2, but showing a change in the spring; and Fig. 4 is a view looking from a point at the right of Fig. 3, with the axle in section on line 1 1 in said latter-named figure, and also showing a broken portion of the vehicle body not shown in Fig. 3.

Referring to the lettered parts of the drawings, A is the body, fulcrumed at the forward end to the thills B, as heretofore. The spring D is bent to form bows at each side of the vehicle-body. These bows extend forward, and their inner bar is secured to the body or seat-bars, Fig. 1. From the bows the spring extends downward and rearward, and the ends are attached to the axle C by means of the link *a*, hinged to the eye *c*, to give a backward and forward movement to the spring when the body swings up and down on its fulcrum at the forward end. The construction is alike on both sides of the vehicle. The torsion action is largely in the bows of the spring.

Of course the shape of the spring may be changed, and it may be differently attached to the axle and body and still have the body supported by a torsion-spring at the rear end and hinged to the thill at the forward end. An equivalent is shown in Figs. 3 and 4. The spring rods or bars D' D' cross each other, and their ends are attached to the axle C and body A or seat-bars.

The body A is not new in this application, and any suitable body or seat-bars may be employed which are hinged to the thills at the forward end and supported from the axle by torsion-springs. When using the style in Fig. 3, it may be preferable that the forward end of the body shall have a sliding or swinging fulcrum; but this is not herein shown, and is a matter of choice.

Having thus described my invention, what I claim is—

1. The combination of a two-wheeled vehicle-axle, thills, a body or seat-bars fulcrumed to the thills at the forward end, and a torsion-spring supporting the body from the axle, substantially as set forth.

2. In a two-wheeled vehicle, the combination of a body fulcrumed at the forward end, the axle and the spring having the bows at each side, and the rearwardly-extending ends attached to the axle, substantially as set forth.

3. The combination, with the body and axle, of the crossed torsion-spring, substantially as set forth.

In testimony of the foregoing I have hereunto subscribed my name in presence of two witnesses.

CHARLES W. NOYES.

Witnesses:
G. D. B. HALL,
J. A. FRANKLIN.